3,101,271
PROCESS FOR PRESERVING TOMATOES AND THE LIKE
Clifford V. Croall, 624 Coyote Road, San Jose, Calif.
No Drawing. Filed Feb. 13, 1961, Ser. No. 88,619
4 Claims. (Cl. 99—154)

This invention relates to a process for preserving fresh tomatoes and the like, and has for its main object the provision of a process for keeping fresh tomatoes in their fresh condition for an indefinite period of time, and which process includes a step for conditioning said tomatoes for eating or for canning or otherwise processing them whenever further use is to be made of them.

Another object of the invention is the provision of a process for preserving fresh tomatoes for an indefinite period of time, which may be several years and more, and which tomatoes at the end of that time will be indistinguishable in their physical characteristics and taste from when they were first processed.

A still further object of the invention is the provision of a process for treating fresh tomatoes and the like that preserves all of the physical taste, and color characteristics of fresh, ripe, unpeeled, tomatoes for an indefinite period of time.

It is well known in the tomato growing and preserving industry that tomatoes; the fruit of the tomato plant, are subject to rapid ripening and every effort is made in the canning industry to pick the tomatoes when they are ripe and to can them immediately so as to prevent loss from spoilage and to avoid having an inferior canned product.

Tomatoes change in color during ripening, the color of the chlorophyll just fading, followed by a yellow or light orange color and then red, and the quality of tomatoes depends to a great degree upon the color, and the retention of the natural red color is of highest importance.

With the present invention, ripe, red tomatoes when at the peak of perfection in color may be preserved without noticeable loss of color, flavor or texture or other characteristics, for many years, and, may at any time be relatively quickly prepared for consumption, canning, or other processing.

Other objects and advantages will appear in the detailed description.

The process of the present invention comprises the step of submerging ripe, red, tomatoes in a brine made up of approximately 1.04% sulphur dioxide and 0.52% of unslaked lime.

This brine may be prepared in the same manner as it is prepared for the preservation of cherries, and while the range or percentage may vary somewhat, the general proportion of approximately half as much lime as sulphur dioxide.

A thick milk of lime is preferably formed and this is introduced into the water at the same time as liquified $SO_2$ may be introduced into the bottom of the body of water and bubbled through the latter, the lime being kept in suspension by stirring. When the reaction is complete the brine is substantially clear. In batch lots in conducting this process, 4.16 lbs. of liquid $SO_2$ and 2.08 lbs. of hydrous lime are mixed with each 50 gallons of water, providing the 1.04% $SO_2$ and 0.52% hydrous, or unslaked lime.

It should be noted that if too little lime is used the resulting pH value may injure the tomatoes or if too much is used the sulphur dioxide will not have a preservative effect.

The tomatoes are kept submerged in the above brine for at least six weeks, thereafter no apparent change occurs. Tomatoes have been kept in the brine for four years before using them, and there is no reason to believe they cannot be kept indefinitely without change.

In the case of cherries, which, as explained, have been preserved in brine of the same kind, they are bleached by the brine to a translucent, white, or cream yellow color, and the calcium hardens the tissues. However, in the case of tomatoes, there is no alteration in color or other physical characteristics, as would be expected from the action on cherries.

When the tomatoes are to be used (after their submersion period in the brine) they are removed and submerged in a solution of $H_2O_2$ for a period of five 24 hour days, changing the solution daily. The temperature of the water does not appear to be critical, provided it is approximately at atmospheric temperature of approximately 45° F. to 85° F., and this can vary except that there should be no freezing.

In actual practice a solution in the proportion of approximately one pint of a 3% solution of $H_2O_2$ to each two quarts of water, or a 0.6% $H_2O_2$ solution is used.

After the tomatoes are washed in the $H_2O_2$ solution as above noted, and then rinsed with fresh water to remove residual $H_2O_2$, they are indistinguishable from freshly picked ripe tomatoes in all respects.

In this connection it should be noted that in other instances, such as where ripe cherries have been preserved in a similar brine solution, the cherries must be washed in running water for a period up to 48 hours and then boiled in several changes of water until the $SO_2$ content is reduced to a predetermined amount before using the cherries.

Such a process would, of course, destroy tomatoes insofar as their natural, fresh, ripe characteristics are concerned.

After the tomatoes have been washed or soaked, or washed in an $H_2O_2$ solution as described, they may be kept in an unchanged condition for an additional month, at least, if kept in fresh water which may be at atmospheric temperature or between approximately 45° F. and 85° F. and longer if the water is refrigerated to maintain it above freezing at approximately between 32° and 40° F. If not placed in water, the tomatoes will start to shrink at the end of a week after the $H_2O_2$ washing step.

In view of the fact that tomatoes cannot be subjected to freezing without destroying them, nor can they be maintained under refrigeration, above freezing, for more than a relatively short of period of time, and even then the flavor and physical characteristics are changed, it is apparent that the present process not only enables persons to enjoy fresh, ripe tomatoes at any time during the year between tomato seasons, but it enables the packer to hold ripe tomatoes for canning at any time, should the canning not, through causes beyond its control, can the tomatoes in time to prevent spoilage thereof.

Insofar as I am aware the solution $H_2O_2$ is the only medium of which I am aware that will free the tomatoes from the taste of the brine so they will have their fresh, ripe flavor.

I claim:

1. The process of preserving the natural red color, flavor, and other physical characteristics of fresh, ripe tomatoes and preparing them for use that comprises the steps of: maintaining said fresh, ripe tomatoes for at least six weeks time in a brine solution of approximately 1.04% $SO_2$ and 0.52% hydrous lime at atmospheric room temperature, thereafter removing said tomatoes from said brine solution and then soaking them for approximately five consecutive twenty-four hour days in a 0.6% solution of $H_2O_2$ at atmospheric room temperature changing said solution to a fresh solution of the $H_2O_2$ each twenty four hours.

2. The process of preserving the natural red color, flavor, and other physical characteristics of fresh, ripe tomatoes and preparing them for use that comprises the steps of: maintaining said fresh, ripe tomatoes for at least six weeks time in a brine solution of approximately 1.04% $SO_2$ and 0.52% hydrous lime at atmospheric room temperature, thereafter removing said tomatoes from said brine solution and then soaking them for approximately five consecutive twenty-four hour days in a 0.6% solution of $H_2O_2$ atmospheric room temperature changing said solution to a fresh solution of the $H_2O_2$ each twenty four hours, and then placing said tomatoes in fresh water having a temperature of approximately the tap temperature of an unheated source of water until ready for use.

3. The process of preserving the natural red color, flavor, and other physical characteristics of fresh, ripe tomatoes that includes the step of:
   (a) maintaining fresh, ripe tomatoes substantially submerged in a brine of approximately 1.04% $SO_2$ and 0.52% unslaked lime at an atmospheric temperature above freezing for a period of substantially six weeks' time,
   (b) removing said tomatoes from said brine and washing them daily with an approximately 0.6% $H_2O_2$ solution until said tomatoes are substantially free from any residue of the brine.

4. The process of preserving the natural red color, flavor, and other physical characteristics of fresh, ripe tomatoes that comprises the steps of:
   (a) maintaining said fresh, ripe tomatoes for at least six weeks in a brine solution of approximately 1.04% $SO_2$ and 0.52% hydrous lime at an atmospheric temperature above freezing and not in excess of approximately 85° F.,
   (b) thereafter removing said tomatoes from said brine solution and soaking them for a plurality of successive twenty-four hour days in daily fresh approximately 0.6% $H_2O_2$ solution at an atmospheric temperature above freezing and not in excess of approximately 85° F. until said tomatoes are substantially free from any residue of the brine solution.

References Cited in the file of this patent
UNITED STATES PATENTS

| | | |
|---|---|---|
| 1,412,523 | Hochstadter | Apr. 11, 1922 |
| 2,494,258 | Nickol | Jan. 10, 1950 |
| 2,539,470 | Pryor | Jan. 30, 1951 |
| 2,759,827 | Griffin | Aug. 21, 1956 |